(12) United States Patent
Lai et al.

(10) Patent No.: US 6,203,581 B1
(45) Date of Patent: Mar. 20, 2001

(54) YELLOW REACTIVE DYE COMPOSITION

(75) Inventors: Bao-Kun Lai, Tau-Yuan Hsien; Jung-Fang Yeh, Taiepi Hsien, both of (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 09/438,386

(22) Filed: Nov. 12, 1999

(51) Int. Cl.$^7$ .............................. D06F 1/384; C09B 67/24

(52) U.S. Cl. ...................................................... 8/549; 8/641

(58) Field of Search ........................................ 8/549, 641

(56) References Cited

U.S. PATENT DOCUMENTS

| | | | |
|---|---|---|---|
| 4,271,072 | * | 6/1981 | Wenghofer et al. . |
| 4,448,583 | * | 5/1984 | Corso . |
| 4,581,036 | * | 4/1986 | Opitz et al. . |
| 5,366,512 | * | 11/1994 | Mischke et al. . |

* cited by examiner

*Primary Examiner*—Margaret Einsmann
(74) *Attorney, Agent, or Firm*—Bacon & Thomas

(57) ABSTRACT

A yellow reactive dye composition which includes two different yellow reactive dyes is disclosed. The yellow reactive dye composition disclosed here is a reactive dye composition with good stability, build-up, light fastness and wet fastness. The yellow reactive dye composition is suitable for the natural and regenerated cellulose fibers in exhaust dyeing, printing and continous dyeing.

2 Claims, No Drawings

YELLOW REACTIVE DYE COMPOSITION

FIELD OF THE INVENTION

The present invention relates to a yellow dye composition, in particular relates to a yellow reactive dye composition suitable for using in dyeing or printing cellulose fiber or fiber materials containing cellulose.

BACKGROUND OF THE INVENTION

Reactive dyes for dyeing or printing cellulose fiber or fiber materials containing cellulose are required to have excellent dyeing properties such as leveling, reproducibility, solubility, and fastness. Particularly, good performance in build-up, reproducibility, vivid hue performance, levelness, and wash off property are very important for yellow reactive dyes. In addition, outstanding color fastness to light, to perspiration and to chlorinated water are also primary requirements for the dyed or printed products.

However, there are many drawbacks to the yellow reactive dyes on market. For example, insufficient build-up for heavy shade is one of the major shortcomings for commercial yellow reactive dyes. Furthermore, dyes with good build-up for heavy shade but often in reddish shade is another drawback found among these yellow reactive dyes. Moreover, drawbacks such as long batch time for cold-pad-batch application incapability of being background color for discharge printing are also the general disadvantages of the yellow reactive dyes on the market.

SUMMARY OF THE INVENTION

It is one object of the present invention to provide a yellow reactive dye composition with good dyeing stability and good build-up.

According to the present invention, it provided a yellow reactive dye composition which comprises:

(a) a reactive dye of the formula (I)

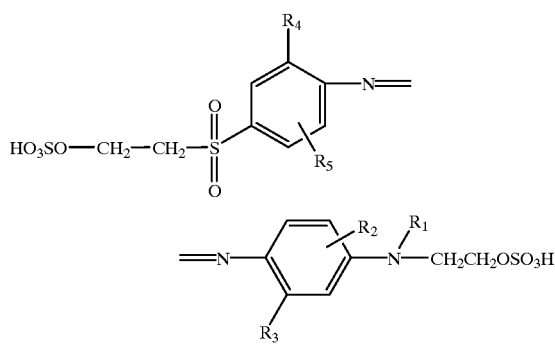

(I)

wherein:
R$_1$ is selected from the group consisting of hydrogen, alkyl having 1–4 carbon atoms, cyanoalkyl having 2–4 carbon atoms, or a sulfuric acid ester of a hydroxy alkyl having 2–4 carbon atoms; each R$_2$, R$_3$, R$_4$, and R$_5$ independently is selected from the group consisting of hydrogen, halogen (for example fluorine, chlorine, bromine or iodine), methyl, ethyl, methoxy, ethoxy; and (b) a reactive dye of the formula (II)

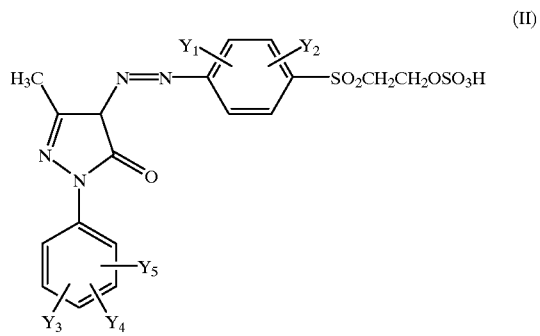

(II)

wherein:
each Y$_1$ and Y$_2$ independently is alkyl having 1–4 carbon atoms, or alkoxy having 1–4 carbon atoms;
each Y$_3$, Y$_4$ and Y$_5$ independently is selected from the group consisting of hydrogen, halogen (for example fluorine, chlorine, bromine or iodine), methyl, or sulphonic acid.

DESCRIPTION OF THE PREFERRED EMBODIMENTS

The preparation of formula (I) of the present invention is described in U.S. Pat. No. 4,271,072. The synthesis of formula (II) of the present invention can be found in German patent Offenlegungsschrift No. 1,150,163.

There is no special limit to the reactive dye represented by formula (I). Preferably, the reactive dye represented by formula (I) could be the reactive dye represented by the following formula (III):

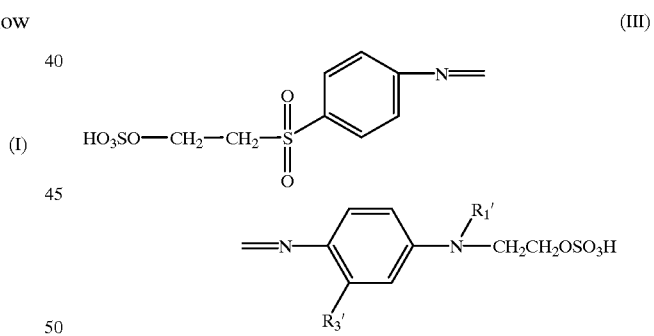

(III)

wherein:
R$_1$' is —CH$_2$CH$_3$ or —CH$_2$CH$_2$—OSO$_3$H;
R$_3$' is hydrogen or chlorine.
More preferably, the reactive dye represented by formula (I) could be the reactive dye represented by the following formula (I-1).

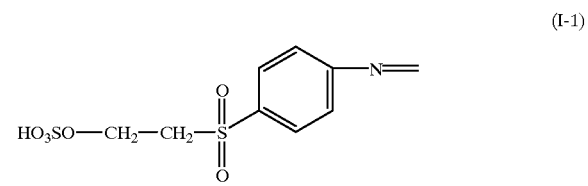

(I-1)

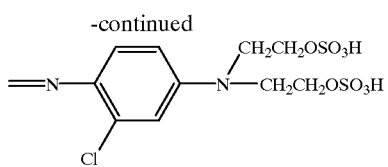

There is no special limit to the reactive dye represented by formula (II). Preferably, the reactive dye represented by formula (II) could be the reactive dye represented by the following formula (II-1):

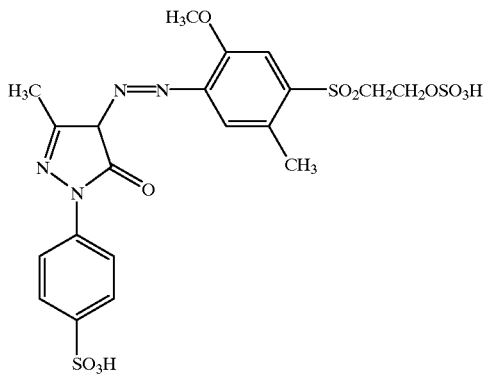

(II-1)

The compositions of the present invention can be prepared in several ways, i.e. by using the separately prepared dye component to mix together to make power, granular and liquid forms, or by mixing two individual dyes as a dyeing recipe in a dyehouse. The dyes of formula I-1 and II-1 are mixed in a weight ratio of the reactive dye of formula I-1 and the reactive dye of formula II-1 of 15~50 to 50~85.

If necessary, the reactive dye composition of the present invention may contain inorganic salts (e.g. sodium sulfate and sodium chloride), dispersants (e.g. β-naphthalenesulfonic acid-formaldehyde condensation products, methylnaphthalenesulfonic acid-formaldehyde condensation products, acetylaminonaphthol based compounds, etc.), de-dusting agents (e.g. di-2-ethylhexyl terephthalate), pH buffering agents (e.g. sodiumacetate, sodiumphosphate, etc.), water softeners, well-known dyeing assistants, etc.

The form of the reactive dye composition of the present invention is not critical. The reactive dye composition can be powder, granular or liquid form.

For convenience in the statement, they are expressed as free acid in the specification. When the dyestuff of the present invention is manufactured, purified, or used, it often exists in the form of water-soluble salt, especially an alkaline metallic salt, such as sodium salt, potassium salt, or ammonium salt.

The yellow reactive dye composition of the present invention can be applied to dye or print fiber materials, especially cellulose fiber or materials containing cellulose. There is no special limit to cellulose suitable for the application of the yellow reactive dye composition of the present invention. All natural and regenerated cellulose fiber (e.g. cotton, linen, jute, ramie fiber, viscose rayon) or fiber materials containing cellulose are the materials to which the yellow reactive dye composition can be applied.

The dyeing or printing of the yellow reactive dye composition can be proceeded by usual or known method. Exhaustion dyeing is applied by using usual inorganic salts (e.g. anhydrous sodium sulfate and sodium chloride) and well-known acid-bindingagents (e.g. sodium carbonate, sodiumhydroxide). The amount of inorganic salts here is not important. Inorganic salts and alkali can be added into the dyeing bath through traditional methods either by once or by several times. In addition, dyeing assistants can be added, too. The range of dyeing temperature is from 40° C. to 90° C. Preferably, the temperature for dyeing is from 40° C. to 70° C.

In a cold-pad-batch application, dye, alkali and customary auxiliaries are padded from the liquor through. The padded, squeezed substrate is often rolled onto an A-frame and batched at room temperature to allow dye fixation to take place.

In a continuous dyeing, it can be divided into two different methods. In the one-bath padding application, dye, alkali (e.g. sodium carbonate or sodium bicarbonate) and customary auxiliaries are padded from the liquor through, the padded, squeezed substrate was then dried by either baking or steam. In the two bath padding application, the substrate is padded through a dye solution bath, pre-dried, a alkali (e.g. sodium hydroxide or sodium silicate) bath, then dye fixed by either baking or steam.

In textile printing, there can be exemplified a method which conducts printing a substrate with a printing paste containing, a well-known acid-binding agent (e.g. sodium bicarbonate), thickener, and completing the dye fixation by dry heat or steam. The dyeing or printing methods employed in the process of the present invention are not limited to these methods.

The yellow reactive dye composition of the present invention has good dyeing properties such as build-up, reproducibility and levelness for printing and dyeing.

The present invention is demonstrated in more detail with reference to the following examples, which are only illustrative and are not intended to limit the scope of the present invention.

In these examples, the compound is represented by free acid, but its actual form can be in salt, or more possibly alkali metal salt, especially sodium salt. In these examples, parts and % are counted by weight, and the temperature is Celsius ° C.

EXAMPLE 1

The dye composition A was formed by mixing the reactive dye represented by formula (I-1) (35 parts) and the reactive dye represented by formula (II-1) (65 parts).

EXAMPLE 2

The dye composition B was formed by mixing the reactive dye represented by formula (I-1) (22 parts) and the reactive dye represented by formula (II-1) (78 parts).

EXAMPLE 3

The dye composition C was formed by mixing the reactive dye represented by formula (I-1) (45 parts) and the reactive dye represented by formula (II-1) (55 parts).

COMPARATIVE EXAMPLE 1

The reactive dye represented by formula (II-1) alone (i.e. the reactive dye without the addition of reactive dye represented by formula (I-1)) was used as a blank sample to compare with the dye composition of the present invention through the following tests.

Test Example 1 (Build-up Property by Pad-Dry-Pad-Steam application)

The yellow reactive dye composition A of example 1 and the reactive dye represented by formula (II-1) alon (comparative example 1) were proceeded the Pad-Dry-Pad-Steam application, respectively, through following steps:

Dye solutions of various concentrations (5, 10, 20, 30, 40 and 60 g/l) were made, respectively, for dyeing mercerized cotton twill (12×30 cm). The mercerized cotton twill was immersed in the dye solutions to absorb dye. The pick-up of the mercerized cotton twill was controlled at about 70%, and the temperature of padding liquor was controlled at 25° C. The mercerized cotton twill was padded and dried by IR predry & flue dryer. Then 70% of sodium silicate (48°B'e) was padded onto the substrate. This treated substrate was steamed for 40 seconds then rinsed, soaping and dried.

Test Result

The test results of the Pad-Dry-Pad-Steam test are shown in table 1.

TABLE 1

(The ΣK/S value obtained by varying concentration of dye solution in a pad-dry-pad-steam application on mercerized cotton twill).

| | Concentration of dye solution (g/l) | | | | | |
|---|---|---|---|---|---|---|
| | 5 | 10 | 20 | 30 | 40 | 60 |
| Formula (II-1) | 23.45 | 50.1 | 84.17 | 106.71 | 119.88 | 128.58 |
| Dye composition A | 29.78 | 54.12 | 106.09 | 129.91 | 145.09 | 159.33 |

(K/S is kubelka coefficient.)

The build-up property is very often to be used for discussing the relationship between dye concentration and dyeing strength. If a dye could keep getting higher dyeing strength by increasing the concentration, it has the good build-up property. Table 1 indicates that the dye composition A of example 1 has better build-up properties than the dye represented by formula (II-1).

Test Example 2 (Build-up Property by Cold-Pad-Batch Application)

The yellow reactive dye composition A of example 1 and the reactive dye represented by formula (II-1) alone (comparative example 1) were proceeded a cold-pad-batch application, respectively, through the following steps:

Pad liquor of concentrations, 5, 10, 20, 30, 40, 60 and 80 g/l of dye were prepared. The alkali system (including caustic soda and sodium silicate) was applied in accordance to the recommendations in table 2. The two above solutions were mixed quickly prior to padding the substrate.

TABLE 2

| | Concentration of dye solution, g/l | | | |
|---|---|---|---|---|
| amount of alkali | 0~20 | 20~40 | 40~70 | 70 |
| amount of NaOH (38°B'e), ml/l | 15 | 20 | 25 | 30 |
| amount of Na₂SiO₃ (48°B'e), g/l | | | 100 | |

The mercerized cotton twills (12×30 cm) or rayon was immersed in the dye solution to absorb dye. The pick-up of the mercerized cotton twill was controlled at about 70%, and the temperature of padding liquor was controlled at 25° C. The mercerized cotton twill was padded by Continue Dyeing M/C. The treated mercerized cotton twill was batched at room temperature for 4 hours and then rinsed, soaping and dried.

Test Result

The test results of the cold-pad-batch test are shown in table 3 and table 4 below:

TABLE 3

(The ΣK/S value obtained by varying concentrations of dye solution in a cold-pad-batch application on mercerized cotton twill.)

| | Concentration of dye solution (g/l) | | | | | |
|---|---|---|---|---|---|---|
| | 5 | 10 | 20 | 30 | 40 | 60 |
| Formula (II-1) | 18.08 | 33.68 | 61.58 | 83.82 | 98.24 | 115.68 |
| Dye composition A | 18.16 | 37.51 | 69.53 | 93.32 | 110.68 | 128.17 |

(K/S is kubelka coefficient.)

TABLE 4

(The ΣK/S value obtained by varying concentrations of dye solution in a cold-pad-batch application on rayon.)

| | Concentration of dye solution (g/l) | | | | | |
|---|---|---|---|---|---|---|
| | 5 | 10 | 20 | 30 | 40 | 60 |
| Formula (II-1) | 20.74 | 33.99 | 76.67 | 97.96 | 118.67 | 136.15 |
| Dye composition A | 22.5 | 42.26 | 79.89 | 112.08 | 130.12 | 154.98 |

(K/S is kubelka coefficient.)

Table 3 and 4 indicate that the dye composition A of example 1 has better build-up properties than the dye represented by formula (II-1) in a cold-pad-batch application.

Test Example 3 (Batch Time Dependence by Cold-Pad-Batch Application)

Both the yellow reactive dye composition A of example 1 and the dye represented by formula (II) were proceeded through the variation of batching time by cold-pad-batch dyeing. The recipe of padding liquor was shown as follow.

| Dye concentration | 30 g/l, |
| | 160 ml |
| NaOH (38° B'e) | 20 ml/l |
| Na₂SiO₃ (48° B'e) | 100 g/l |

The dye solution was quickly mixed with alkali solution prior to padding the substrate.

The mercerized cotton twill was immersed in dye solutions to absorb dye. The pick-up of the mercerized cotton twill was controlled at about 70%, and the temperature of padding liquor was controlled at 25° C. The mercerized cotton twill was padded by Continue Dyeing M/C. The treated mercerized cotton twill was batched at 35° C. for 1, 2, 3, 4, 6, 8, 10, 12, 16, 24, 32 and 48 hours, respectively. The mercerized cotton twill was rinsed, soaping and dried.

Test Result

The test results of the batch time dependence test are shown in table 5 below:

TABLE 5

(The relative strength obtained by varying Batch-time in a cold-pad-batch application on mercerized cotton twill.)

| | Batch time (hr) | | | | | | | | | | |
|---|---|---|---|---|---|---|---|---|---|---|---|
| | 1 | 2 | 3 | 4 | 6 | 8 | 10 | 12 | 16 | 24 | 32 | 48 |
| Formula (II-1) | 97 | 103 | 103 | 103 | 105 | 101 | 101 | 100 | 99 | 100 | 97 | 94 |
| Dye composition A | 99 | 102 | 101 | 103 | 102 | 100 | 99 | 99 | 100 | 100 | 97 | 96 |

The strength obtained at Batch-time (4 hr) was taken as control (100%).

The relative strength by varying batch time for both dyestuffs can be seen in table 5. The results of the dye composition A show the less variation than those of the dye represented by formula (II-1). It means that the variation of batch time does not have much influence on the dye composition A.

Test 4 (Steam Time Dependence By Pad-Dry-Pad-Steam Application)

The yellow reactive dye composition A of example 1 and the reactive dye represented by formula (II-1) alone (comparative example 1) were proceeded a steam time dependence test, respectively, through the following steps.

Dye solutions of 30 g/l were made and used to dye mercerized cotton twills (12×30 cm). The mercerized cotton twill was immersed in the dye solution to absorb dye. The pick-up of the mercerized cotton twill was controlled at about 70%, and the temperature of padding liquor was controlled at 25° C. The mercerized cotton twill was padded and dried dyed by IR predry & flue dryer. Then the alkali solution (A), (B) and (C) were respectively padded onto the mercerized cotton twill. The amount of alkali solution (A), (B) and (C) used here were listed below:

alkali solution (A): NaOH(38°B'e)14 ml/l+$Na_2CO_3$10 g/l+$Na_2SO_4$250 g/l.

alkali solution (B): NaOH(38°B'e)15 ml/l+$Na_2SO_4$250 g/l.

alkali solution (C): $Na_2SiO_3$(48°B'e)70%.

The treated mercerized cotton twill was steamed for 20, 30, 40, 50, 60, 70, 80 and 90 seconds, respectively. Afterwards the steamed substrate was rinsed, soaping, and dried.

Test Result

The results of the steam time dependence test are shown in table 6, 7 and 8 below:

TABLE 6

(The relative strength obtained by varying steaming time with alkali solution A in a pad-dry-pad-steam application on mercerized cotton twill.)

| | Steam time (second) | | | | | | | |
|---|---|---|---|---|---|---|---|---|
| | 20 | 30 | 40 | 50 | 60 | 70 | 80 | 90 |
| Formula (II-1) | 99.50 | 100.3 | 100.0 | 95.72 | 96.04 | 95.12 | 98.80 | 95.11 |
| Dye composition A | 99.10 | 100.4 | 100.0 | 99.33 | 99.63 | 99.49 | 99.43 | 99.19 |

TABLE 6-continued (The relative strength obtained by varying steaming time with alkali solution A in a pad-dry-pad-steam application on mercerized cotton twill.)

| Steam time (second) | | | | | | | |
|---|---|---|---|---|---|---|---|
| 20 | 30 | 40 | 50 | 60 | 70 | 80 | 90 |

The strength obtained at steaming time (40 sec) was taken as control (100%).

TABLE 7

(The relative strength obtained by varying steaming time with alkali solution B in a pad-dry-pad-steam application on mercerized cotton twill.)

| | Steam time (second) | | | | | | | |
|---|---|---|---|---|---|---|---|---|
| | 20 | 30 | 40 | 50 | 60 | 70 | 80 | 90 |
| Formula (II-1) | 100.3 | 100.9 | 100.0 | 96.78 | 97.64 | 96.61 | 98.46 | 97.34 |
| Dye composition A | 98.46 | 100.1 | 100.0 | 100.8 | 98.61 | 97.16 | 98.06 | 98.0 |

The strength obtained at steaming time (40 sec) was taken as control (100%)

TABLE 8

(The relative strength obtained by varying steaming time with alkali solution C in a pad-dry-pad-steam application on mercerized cotton twill.)

| | Steam time (second) | | | | | | | |
|---|---|---|---|---|---|---|---|---|
| | 20 | 30 | 40 | 50 | 60 | 70 | 80 | 90 |
| Formula (II-1) | 99.30 | 100.3 | 100.0 | 100.7 | 101.6 | 98.50 | 99.05 | 97.06 |
| Dye composition A | 100.9 | 101.5 | 100.0 | 101.3 | 101.8 | 101.5 | 99.75 | 99.24 |

The strength obtained at steaming time (40 sec) was taken as control (100%).

A dye, possessing smaller variation of relative color strength with different steaming time, has the good steaming time dependency property.

Table 6, 7 and 8 indicate that the dye composition A of example 1 has better steaming time dependency property than the dye represented by formula (II-1) in the pad-dry-pad-steam application with different alkali systems.

Test Example 5 (Color Fastness to Light)

The substrates, dyed with both the yellow reactive dye composition A of example 1 and the reactive dye represented by formula (II-1) alone (comparative example 1), were proceeded a color fastness to light test, respectively, through the following steps:

Pad liquor of concentrations 10, 30 and 60 g/l of dye were prepared. The alkali system including caustic soda and sodium silicate was applied in accordance to the recommendations in table 9. The above solutions were mixed quickly prior to padding the substrate.

TABLE 9

| The amount of base | The concentration of dye, g/l | | | |
|---|---|---|---|---|
| | 0~20 | 20~40 | 40~70 | 70 |
| amount of NaOH (38°B'e), ml/l | 15 | 20 | 25 | 30 |
| amount of Na$_2$SiO$_3$ (48°B'e), g/l | | | 100 | |

The mercerized cotton twill was immersed in the dye solutions to absorb dye. The pick-up of the mercerized cotton twills (12×30) was controlled at about 70%, and the temperature of padding liquor was controlled at 25° C. The mercerized cotton twill was padded and then batched at room temperature for 4 hours. The mercerized cotton twill was rinsed, soaping and dried. The final mercerized cotton twill was exposed by a Xenon-Arc Lamp Light (AATCC 16E 1989) for 40 AFU.

Test Result

The test results of color fastness to light test are shown in table 10:

TABLE 10

(The light fastness assessed by varying concentration of dye solution in a cold-pad-batch application on mercerized cotton twill.)

| | Concentration of dye | | | | | |
|---|---|---|---|---|---|---|
| | 10 g/l | | 30 g/l | | 60 g/l | |
| | ISO | AATCC | ISO | AATCC | ISO | AATCC |
| Formula (II-1) | 2 | 2–3 | 2 | 2 | 2–3 | 2–3 |
| Dye composition A | 2–3 | 2–3 | 3 | 3–4 | 4 | 4–5 |

The grade of color fastness to light were assessed with DATA MATCH spectro photometer. The higher value of grade means the better light fastness.

Table 10 indicates every grade of light fastness at the same dye concentration of the dye composition A of example 1 is higher than that of the dye represented by formula (II-1) It means that the dye composition A of example 1 has better light fastness.

Test Example 6 (Color Fastness to Washing Test)

Both the yellow reactive dye composition A of example 1 and the dye represented by formula (II) were proceeded the cold-pad-batch dyeing. The recipe of padding liquor was shown as follow.

| Dye concentration | 30 g/l, 160 ml |
|---|---|
| NaOH (38° B'e) | 20 ml/l |
| Na$_2$SiO$_3$ (48° B'e) | 100 g/l |

The dye solution was quickly mixed with alkali solution prior to padding the substrate.

The mercerized cotton twill was immersed in dye solutions to absorb dye. The pick-up of mercerized cotton twill was controlled at about 70%, and the temperature of padding liquor was controlled at 25° C. The mercerized cotton twills was padded and then batched at room temperature for 4 hours, and then rinsed, soaping and dried. The dyed fabric was then proceeded an AATCC 61IIA color fastness to washing test.

Test Result

The test results of the color fastness to washing test are shown in table 11:

TABLE 11

(The assessment of wash fastness of mercerized cotton twill.)

| | Change of color | |
|---|---|---|
| | ISO | AATCC |
| Formula (II-1) | 4–5 | 4–5 |
| Dye composition A | 4–5 | 5 |

The grade of color fastness to washing were assessed with DATA MATCH spectro photometer. The higher-grade value means the better washing fastness.

Table 11 indicates the grade of wash fastness of the dye composition A of example 1 is higher than that of the dye represented by formula (II-1). It means that the dye composition A of example 1 has better washing fastness.

The yellow dye composition of the present invention can be widely applied to dye a greater range of textiles. The composition of the present invention can be used in traditional dyeing methods, for example, exhausting, printing, or continuous dyeing.

For dyeing cellulose, the yellow dye composition of the present invention is a good composition of great commercial value. It performs excellent properties of build-up, light fastness, washing fastness, easy wash-off, and levelness.

From the foregoing description, one skilled in the art can easily ascertain the essential characteristics of this invention, and without departing from the scope thereof, can make various changes and modifications of the invention to adapt it to various usages and conditions. Thus, other embodiments are also within the claims.

What is claimed is:
1. A reactive dye composition, which comprises: (a) a reactive dye having a formula (I-1)
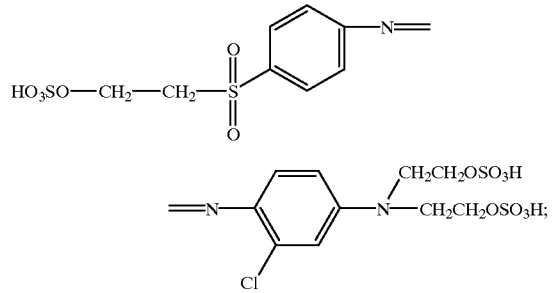
(b) a reactive dye having a formula (II-1)
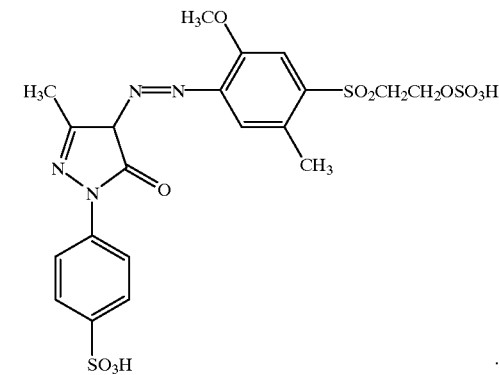
2. A composition according to claim 1, wherein the weight ratio of the reactive dye formula (I-1) and the reactive dye of the formula (II-1) is from 15~50 to 50~85.
* * * * *